United States Patent
Chang

(10) Patent No.: US 10,797,793 B2
(45) Date of Patent: Oct. 6, 2020

(54) VISIBLE LIGHT IDENTITY AUTHORIZATION DEVICE, VISIBLE LIGHT IDENTITY AUTHORIZATION SYSTEM HAVING THE SAME AND METHOD THEREOF

(71) Applicant: TamKang University, New Taipei (TW)

(72) Inventor: Shih-Hao Chang, Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 301 days.

(21) Appl. No.: 15/693,720

(22) Filed: Sep. 1, 2017

(65) Prior Publication Data

US 2018/0227756 A1    Aug. 9, 2018

(30) Foreign Application Priority Data

Feb. 7, 2017   (TW) .............................. 106103990 A

(51) Int. Cl.
*H04L 29/06*       (2006.01)
*H04B 10/116*      (2013.01)
*H04W 12/06*       (2009.01)

(52) U.S. Cl.
CPC ........ *H04B 10/116* (2013.01); *H04L 63/0861* (2013.01); *H04W 12/0605* (2019.01)

(58) Field of Classification Search
CPC ... H04W 12/06; H04L 63/0861; H04B 10/116
See application file for complete search history.

(56) References Cited

U.S. PATENT DOCUMENTS

| | | | | |
|---|---|---|---|---|
| 2009/0067846 A1* | 3/2009 | Yu | ....................... | H04B 10/1143 398/128 |
| 2010/0250944 A1* | 9/2010 | Suzuki | .................... | G06F 21/32 713/172 |
| 2012/0159599 A1* | 6/2012 | Szoke | ..................... | G06F 21/32 726/7 |
| 2015/0089241 A1* | 3/2015 | Zhao | ...................... | H04N 5/335 713/186 |
| 2017/0103647 A1* | 4/2017 | Davis | .................... | G06F 1/3287 |
| 2017/0116609 A1* | 4/2017 | Geraud | ................ | G06Q 20/327 |

OTHER PUBLICATIONS

Yang—NPL 2006 (Year: 2006).*

* cited by examiner

*Primary Examiner* — Tri M Tran
(74) *Attorney, Agent, or Firm* — WPAT, PC

(57) ABSTRACT

An electronic device is provided, which may include a biometric module, a processing module and a light transmission module. The biometric module may recognize a biological feature, and convert the biological feature into a biological feature signal via an analysis algorithm. The processing module may encrypt an international mobile equipment identity number of the electronic device and the biological feature signal to generate an encrypted signal, and convert the encrypted signal into a visible light signal. The light transmission module may transmit the visible light signal to a controlled device.

13 Claims, 6 Drawing Sheets

VISIBLE LIGHT IDENTITY AUTHORIZATION DEVICE, VISIBLE LIGHT IDENTITY AUTHORIZATION SYSTEM HAVING THE SAME AND METHOD THEREOF

CROSS-REFERENCE TO RELATED APPLICATION

This application claims the benefit of Taiwan Patent Application No. 106103990, filed on Feb. 7, 2017, in the Taiwan Intellectual Property Office, the disclosure of which is incorporated herein in its entirety by reference.

BACKGROUND OF THE INVENTION

1. Field of the Invention

The present invention generally relates to a visible light communication technology, in particular to an electronic device capable of performing an identity authorization process via visible light. The present invention further relates to a visible light identity authorization system having the electronic device, and the visible light identity authorization method thereof.

2. Description of the Related Art

In recent years, the light emitting diodes (LED) has become the major lighting products; the current wireless communication technology begins to integrate the LEDs with function of the visible light communication module in order to provide a novel visible light communication technique. As the visible light communication technology can not only use the LEDs to serve as the light source, but also can transmit the digital data via the visible light signals transmitted from the LEDs; in addition, the visible light communication technology can achieve extremely high transmission speed and transmission capacity within the proper transmission range; accordingly, the visible light communication technology has become the development trend in the future. The visible light communication technology can make the LEDs provide both of the energy-saving lighting function and the intelligent communication function, which can be applied to broadband Internet access, indoor navigation, indoor positioning, personnel management and other commercial applications.

However, the visible light signals emitted by the LEDs have directivity, and a specific beam angle; accordingly, when a user uses a device to transmit the visible light signals to a target device, the visible light signals may be received by the other nearby devices; for the reason, the visible light signals tend to be eavesdropped or intercepted during the transmission process. Thus, the information security of the current visible light communication technology is still untrustful.

Besides, as the information security of the current visible light communication technology still needs to be further enhanced, the current visible light communication technology cannot be applied to entry access control, data management and other similar applications. Therefore, the application range of the current visible light communication technology is still limited.

Thus, it has become an important issue to provide a visible light communication technology in order to improve the shortcomings of the conventional visible light communication technology.

SUMMARY OF THE INVENTION

Therefore, it is a primary objective of the present invention to provide a visible light communication technology in order to improve the shortcomings of the conventional visible light communication technology.

To achieve the foregoing objective, the present invention provides an electronic device, which may include a biometric module, a processing module and a light transmission module. The biometric module may recognize a biological feature, and convert the biological feature into a biological feature signal via an analysis algorithm. The processing module may encrypt an international mobile equipment identity number of the electronic device and the biological feature signal to generate an encrypted signal, and convert the encrypted signal into a visible light signal. The light transmission module may transmit the visible light signal to a controlled device.

To achieve the foregoing objective, the present invention further provides a visible light identity authorization system, which may include an electronic device and a controlled device. The electronic device may recognize a biological feature, convert the biological feature into a biological feature signal via an analysis algorithm, encrypt an international mobile equipment identity number of the electronic device and the biological feature signal via an encryption algorithm to generate an encrypted signal, and then convert the encrypted signal into a visible light signal. The controlled device may receive the visible light signal, convert the visible light signal into the encrypted signal, and decrypt the encrypted signal to perform an identity authorization process.

To achieve the foregoing objective, the present invention still further provides a visible light identity authorization method, which may include the following steps: recognizing a biological feature via an electronic device; converting the biological feature into a biological feature signal via an analysis algorithm by the electronic device; encrypting an international mobile equipment identity number of the electronic device and the biological feature signal via an encryption algorithm to generate an encrypted signal, and convert the encrypted signal into a visible light signal by the electronic device; receiving the visible light signal and converting the visible light signal into the encrypted signal by the controlled device; and decrypting the encrypted signal by the controlled device to perform an identity authorization process.

In a preferred embodiment of the present invention, the analysis algorithm may be the learning vector quantization (LVQ).

In a preferred embodiment of the present invention, the encryption algorithm may be the message-digest algorithm.

In a preferred embodiment of the present invention, the biological feature may be a fingerprint or an iris pattern.

In a preferred embodiment of the present invention, the electronic device may output the visible light signal via a light transmission module, and the light transmission module may be a screen, a light source or a flash lamp.

In a preferred embodiment of the present invention, the controlled device may receive the visible light signal via a light receiving module, and the light receiving module may be a photo diode or a lens.

In a preferred embodiment of the present invention, the electronic device may be a mobile communication device, a personal computer, a camera device or an IoT device.

The visible light identity authorization device, the visible light identity authorization system and the method thereof in accordance with the present invention may have the following advantages:

(1) According to one embodiment of the present invention, the electronic device can encrypt the international mobile equipment identity number of the electronic device and a biological feature signal to generate an encrypted signal, so the encrypted signal can simultaneously have both of the uniqueness of the international mobile equipment identity number and the specialty of the biological feature, which can optimize the information security of the encrypted signal.

(2) According to one embodiment of the present invention, the electronic device has a special encryption mechanism, which can achieve high information security, so is applicable to entry access control, data management and the like.

(3) According to one embodiment of the present invention, the electronic device can integrate the learning vector quantization and the message-digest algorithm; thus, the electronic device can simultaneously better the performance of the biological feature identification and improve the information security of the signal encryption.

(4) According to one embodiment of the present invention, the electronic device can use the learning vector quantization to perform the biological feature identification and use the message-digest algorithm to perform the data encryption; both of the above algorithms can be directly applied to various electronic devices, such as mobile communication device, personal computer, camera or IoT device, etc., which is more flexible in use.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
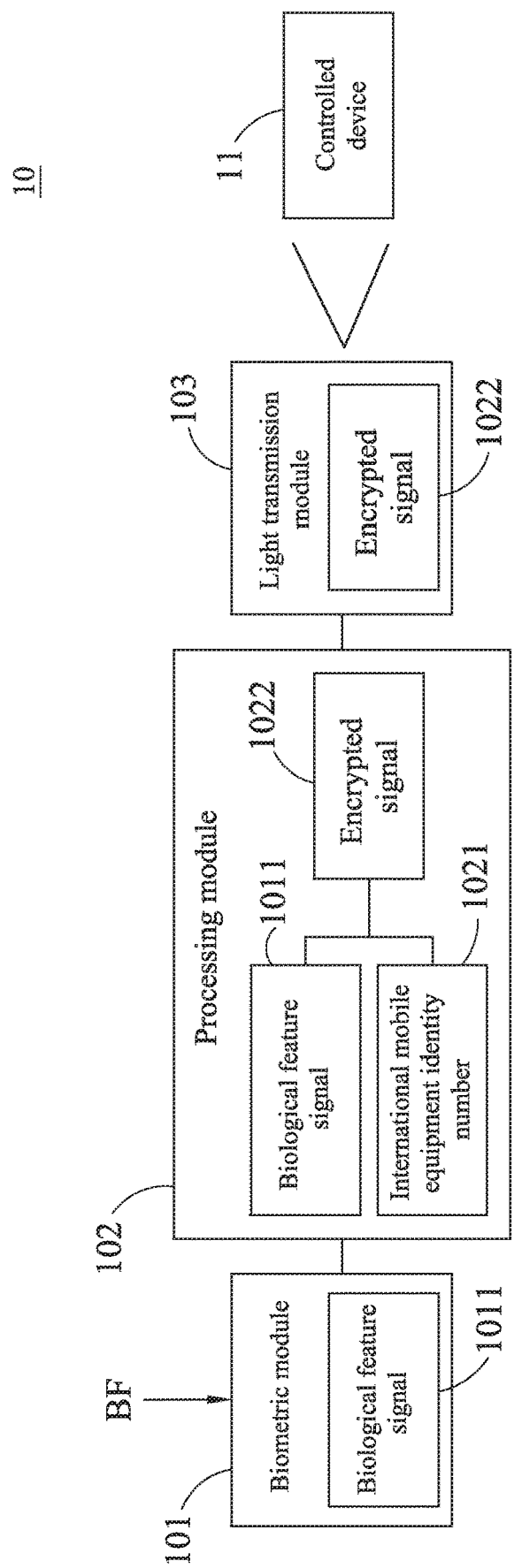
FIG. 1 is a block diagram of an electronic device of a first embodiment in accordance with the present invention.

With reference to FIG. 1 for a block diagram of an electronic device of a first embodiment in accordance with the present invention, the electronic device 10 may include a biometric module 101, a processing module 102 and a light transmission module 103.

The biometric module 101 may recognize a biological feature BF, and convert the biological feature BF into a biological feature signal 1011 via an analysis algorithm; in a preferred embodiment, the biological feature BF may be a fingerprint or an iris pattern of a user, or other biological features with uniqueness and non-repudiation.

The processing module 102 may encrypt an international mobile equipment identity (IEMI) number 1021 of the electronic device 10 and the biological feature signal 1011 to generate an encrypted signal 1022, and convert the encrypted signal 1022 into a visible light signal VS; in a preferred embodiment, the processing module 102 may be a microcontroller unit (MCU) or a CPU.

The light transmission module 103 may transmit the visible light signal VS to a controlled device 11; in a preferred embodiment, the electronic device 10 may be a mobile communication device, a personal computer, a camera device, an IoT device or the other similar computer devices; the light transmission module 103 may be a screen, a light source or a flash lamp of the electronic device 10, or other elements of the electronic device 10 which can emit light.

In the embodiment, the electronic device 10 can integrate the international mobile equipment identity number 1021 and the biological feature signal 1011, and encrypt which to generate the encrypted signal 1022, so the encrypted signal 1022 can have both of the uniqueness of the international mobile equipment identity number 1021 and the non-repudiation of the biological feature signal 1011; thus, the information security of the encrypted signal 1022 can be optimized. Besides, the electronic device 10 of the embodiment can also transmit digital data by the same way and make sure that the information security of the data transmission is high, so can be applied to entry access control, data management and other similar applications. Therefore, the electronic device 10 of the embodiment can exactly solve the problem that the conventional visible light communication technology is of low information security.

Figure 2:
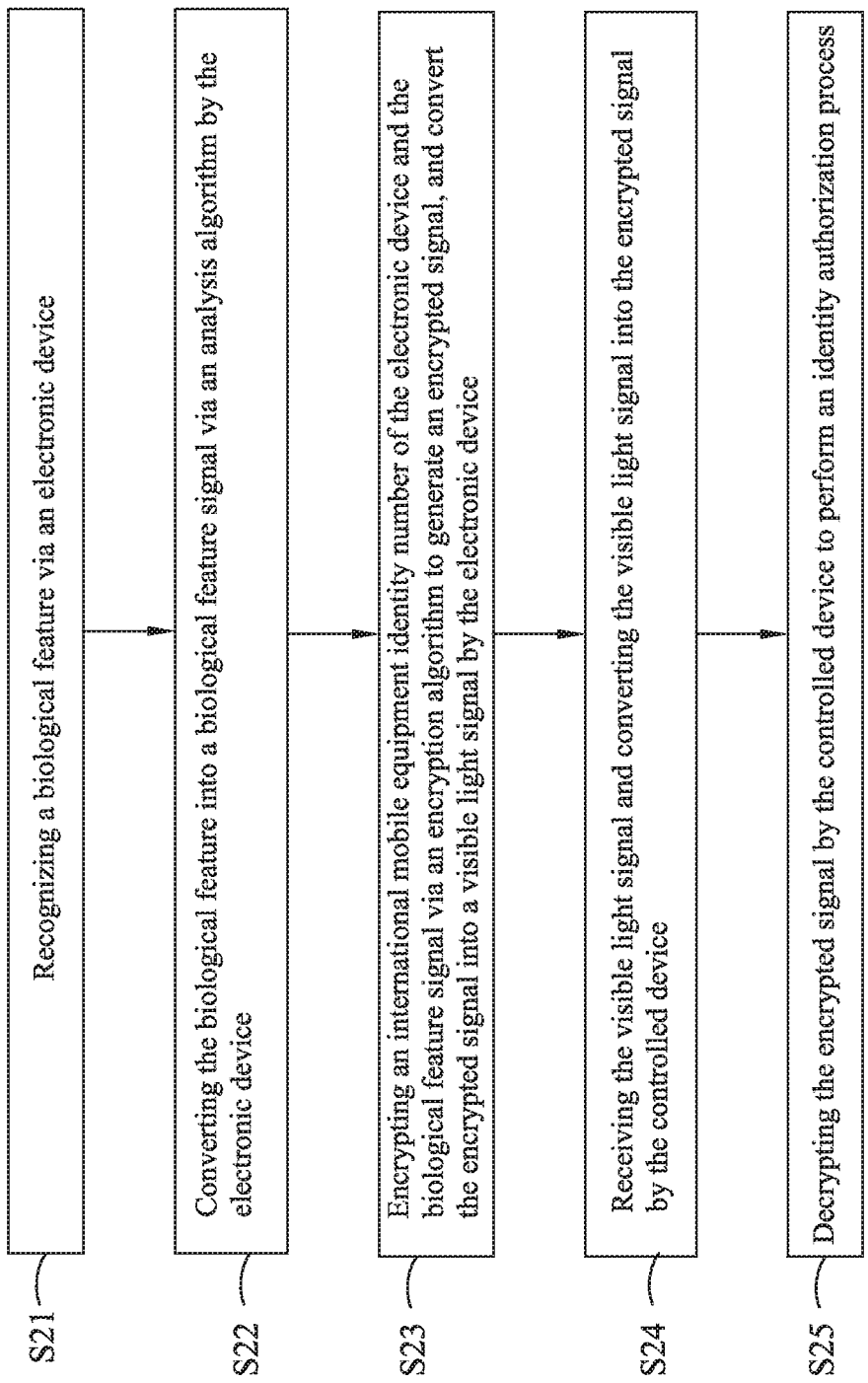
FIG. 2 is a flow chart of the above embodiment in accordance with the present invention.

With reference to FIG. 2 for a flow chart of the electronic device of the first embodiment in accordance with the present invention, the visible light identity authorization method of the electronic device 10 of the embodiment may include the following steps:

Step S21: Recognizing a biological feature via an electronic device.

Step S22: Converting the biological feature into a biological feature signal via an analysis algorithm by the electronic device.

Step S23: Encrypting an international mobile equipment identity number of the electronic device and the biological feature signal via an encryption algorithm to generate an encrypted signal, and convert the encrypted signal into a visible light signal by the electronic device.

Step S24: Receiving the visible light signal and converting the visible light signal into the encrypted signal by the controlled device.

Step S25: Decrypting the encrypted signal by the controlled device to perform an identity authorization process.

It is worthy to point out that the conventional visible light communication technology lacks a reliable encryption mechanism, so the information security thereof cannot be effectively improved. On the contrary, the electronic device can encrypt the international mobile equipment identity number of the electronic device and a biological feature signal to generate an encrypted signal, so the encrypted signal can simultaneously have both of the uniqueness of the international mobile equipment identity number and the specialty of the biological feature, which can optimize the information security of the encrypted signal.

Besides, as the information security of the conventional visible light communication technology still needs to be further improved, the conventional visible light communication technology cannot be applied to entry access control, data management and other similar applications; therefore, the application range of the conventional visible light communication technology is still limited. On the contrary, according to one embodiment of the present invention, the electronic device has a special encryption mechanism, which can achieve high information security, so is applicable to entry access control, data management and the like; therefore, the application range thereof can be more comprehensive.

Figure 3:
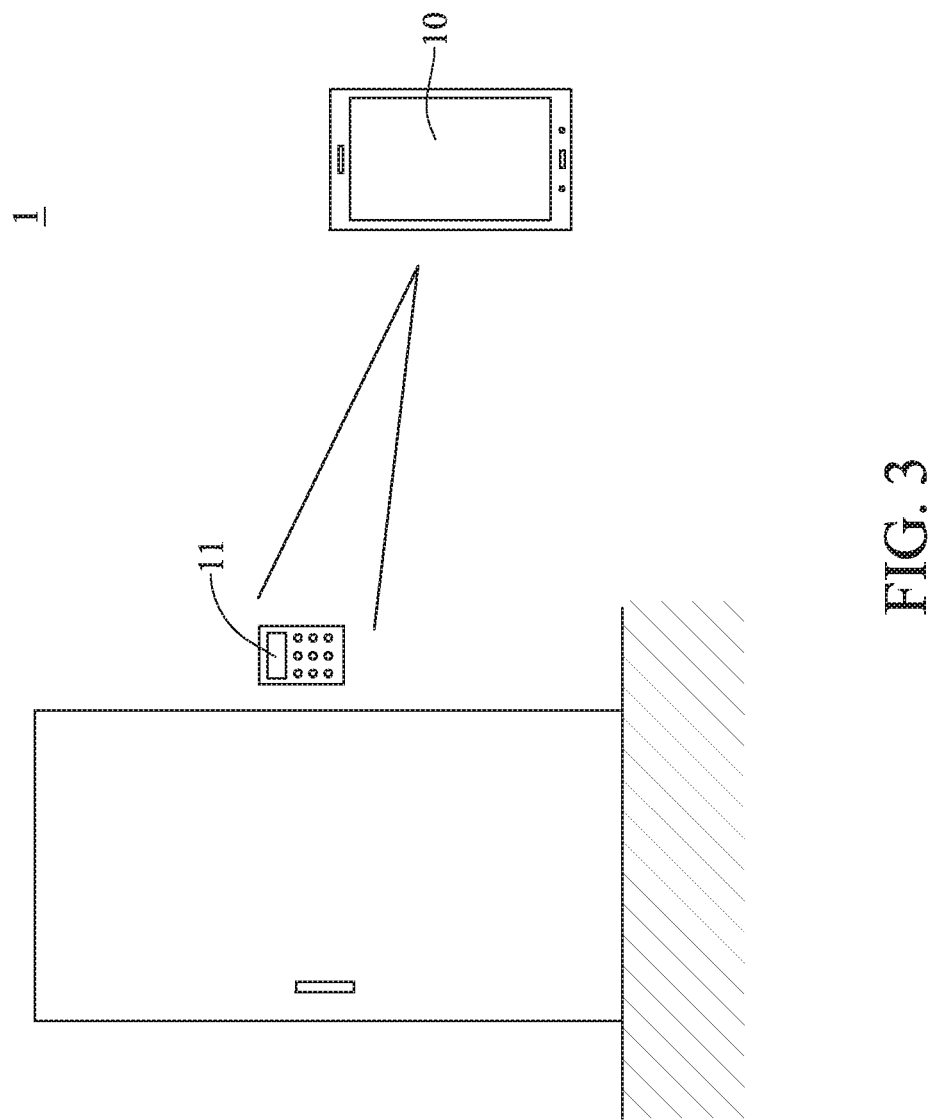
FIG. 3 is a schematic view of a visible light identity authorization system of a first embodiment in accordance with the present invention.

With reference to FIG. 3 for a schematic view of a visible light identity authorization system of a first embodiment in accordance with the present invention, the visible light identity authorization system 1 may include an electronic device 10 and a controlled device 11; in the embodiment, the electronic device 10 may be a smart phone, and the controlled device may be an entry access control device.

The electronic device 10 can recognize a biological feature of a user, such as fingerprint, convert the biological feature into a biological feature signal via an analysis algorithm, encrypt an international mobile equipment identity number of the electronic device 10 and the biological feature signal via an encryption algorithm to generate an encrypted signal, and then convert the encrypted signal into a visible light signal VS. Afterward, the user can use the screen, the light source or the flash lamp of the electronic device 10 to transmit the visible light signal VS.

In the embodiment, the analysis algorithm may be the learning vector quantization (LUQ), which can effectively convert the biological feature into the biological feature signal, and reduce the false rejection rate and the false acceptance rate of the biological feature identification; in addition, the above algorithm is applicable to most electronic devices. The encryption algorithm may be the message-digest algorithm, in particular to the message-digest algorithm 5 (MD5), which can more effectively integrate the international mobile equipment identity number with the biological feature signal, and convert which into the encrypted signal. In this way, the encrypted signal can have both of the uniqueness of the international mobile equipment identity number and the non-repudiation of the biological feature signal, so the information security of the encrypted signal can be optimized. In addition, the combination of the above algorithms is applicable to most electronic devices.

The controlled device 11 can receive the visible light signal VS via the photo diode or the lens thereof, convert which into the encrypted signal and decrypt the encrypted signal to generate a decrypted signal so as to perform the identity authorization process. More specifically, the controlled device 11 can compare the decrypted signal with the data stored in the database to perform the identity authorization process. If the identity authorization process succeeds, the controlled device 11 can generate an authorization success signal; meanwhile, the controlled device 11 can open the door lock, and operate according to the decrypted signal.

Moreover, the electronic device 10 of the visible light identity authorization system 1 of the embodiment can not only use the above method to perform the identity authorization process, but also can transmit digital data by the above method to make sure that the data transmission is of high security; thus, the visible light identity authorization system 1 is applicable to entry access control, data management and other similar applications.

As described above, the electronic device 10 of the visible light identity authorization system 1 of the embodiment can integrate the learning vector quantization with the message-digest algorithm, so better the performance of the biological feature identification and optimize the information security of the signal encryption; therefore, the visible light identity authorization system 1 can achieve an unpredictable technical effect.

Furthermore, the electronic device 10 of the visible light identity authorization system 1 of the embodiment can use the learning vector quantization to perform the biological feature identification and use the message-digest algorithm to encrypt the signals; the above two algorithms can be directly applied to various electronic devices, such as mobile communication device, personal computer, camera or IoT device, etc., which is more flexible in use.

Figure 4:
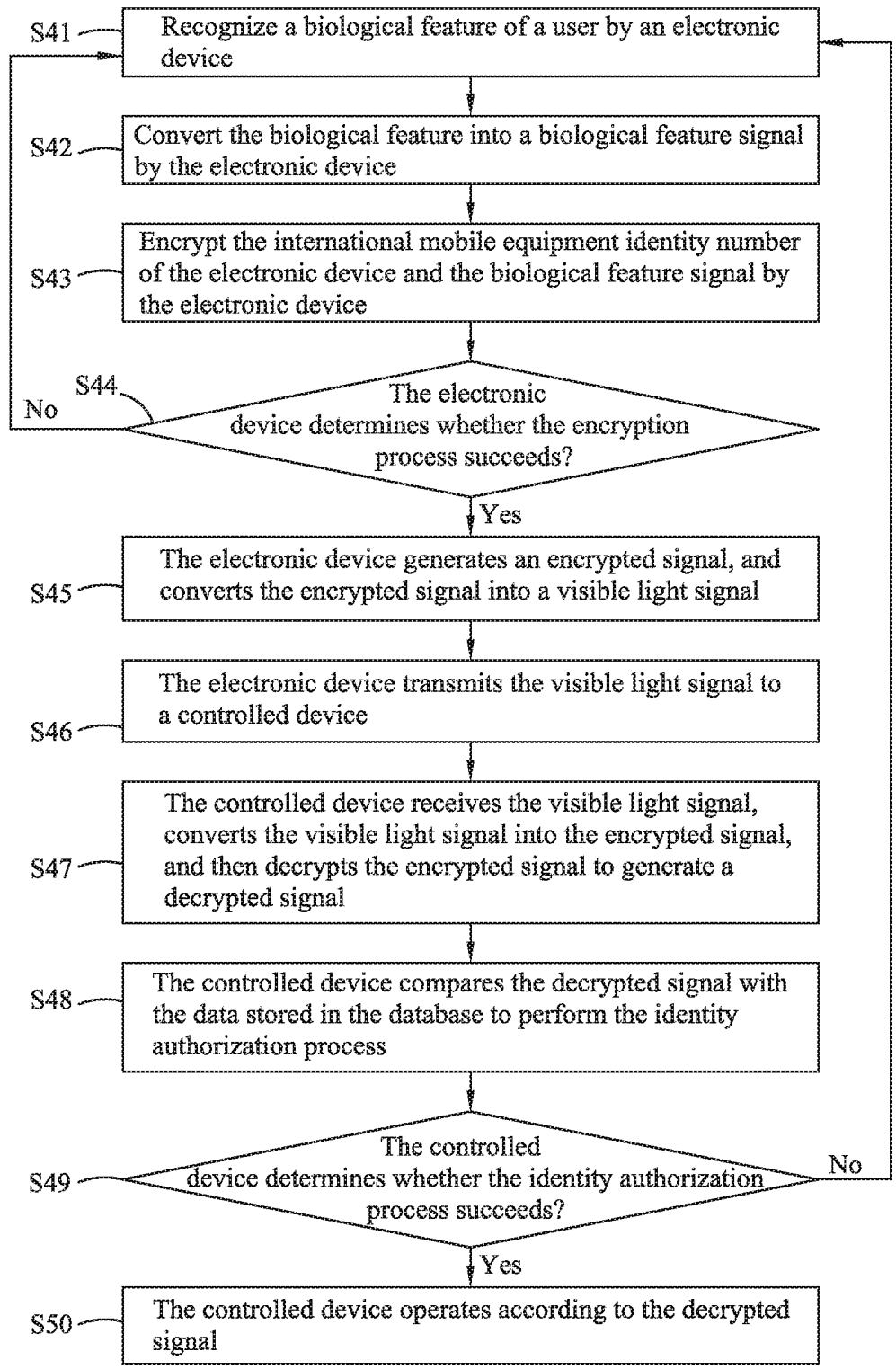
FIG. 4 is a flow chart of the above embodiment in accordance with the present invention.

With reference to FIG. 4 for a flow chart of the visible light identity authorization system of the first embodiment in accordance with the present invention, the visible light identity authorization method of the visible light identity authorization system 1 of the embodiment may include the following steps:

Step S41: a user uses an electronic device to recognize a biological feature of the user; then, the flow proceeds to Step S42.

Step S42: the electronic device converts the biological feature into a biological feature signal via the learning vector quantization; then, the flow proceeds to Step S43.

Step S43: the electronic device encrypts the international mobile equipment identity number of the electronic device and the biological feature signal via the message-digest algorithm; then, the flow proceeds to Step S44.

Step S44: the electronic device determines whether the encryption process succeeds? if it does, the flow proceeds to Step S45; if it does not, the flow returns to Step S41.

Step S45: the electronic device generates an encrypted signal, and converts the encrypted signal into a visible light signal; then, the flow proceeds to Step S46.

Step S46: the electronic device transmits the visible light signal to a controlled device via the flash lamp thereof; then, the flow proceeds to Step S47.

Step S47: the controlled device receives the visible light signal via the lens thereof, converts the visible light signal into the encrypted signal, and then decrypts the encrypted signal to generate a decrypted signal; then, the flow proceeds to Step S48.

Step S48: the controlled device compares the decrypted signal with the data stored in the database to perform the identity authorization process; then, the flow proceeds to Step S49.

Step S49: the controlled device determines whether the identity authorization process succeeds? If it does, the flow proceeds to Step S50; if it does not, the flow returns to Step S41.

Step S50: the controlled device operates according to the decrypted signal.

Figure 5:
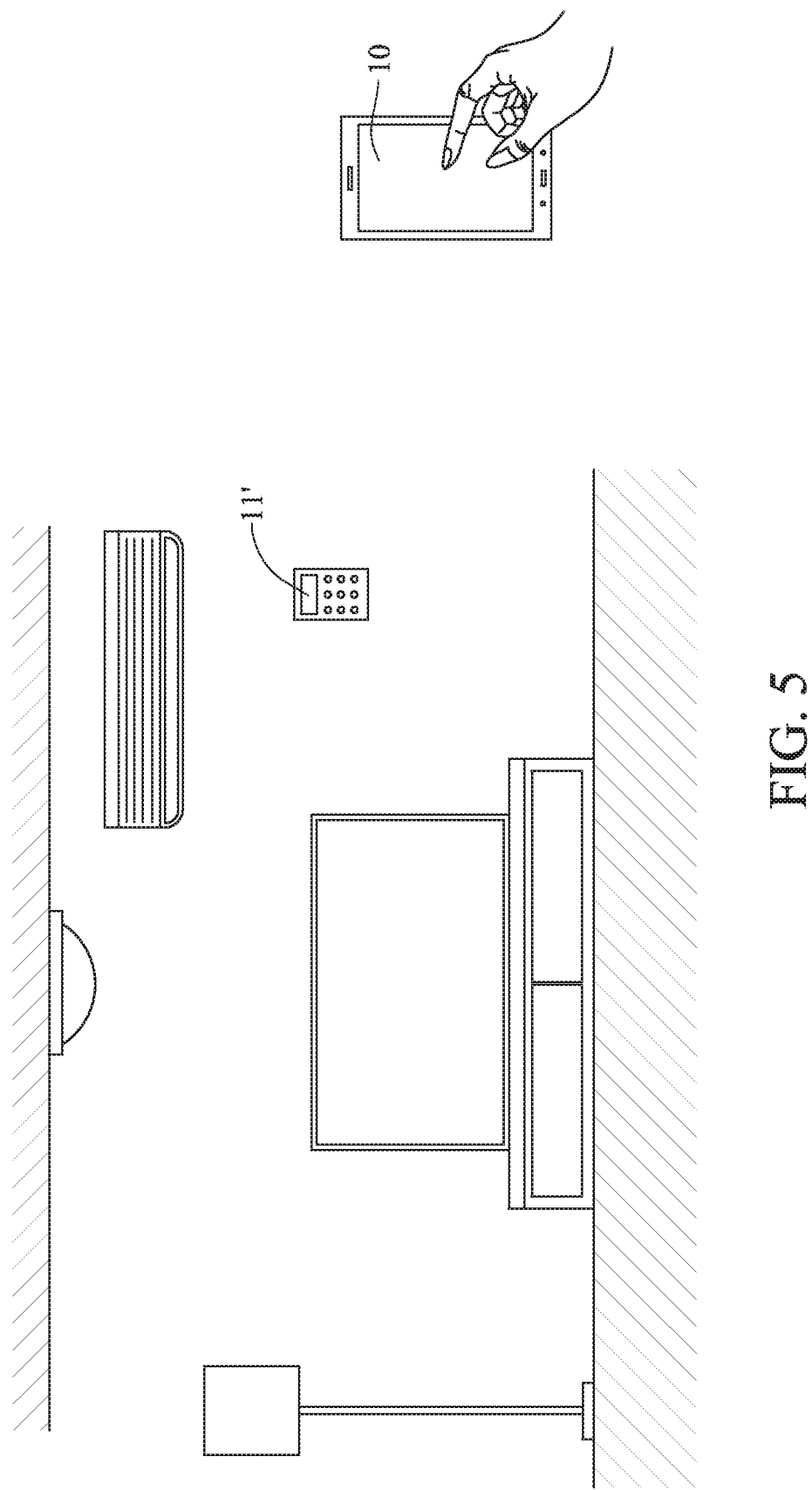
FIG. 5 and FIG. 6 is a first schematic view and a second schematic view of a visible light identity authorization system of a second embodiment in accordance with the present invention.
Figure 6:
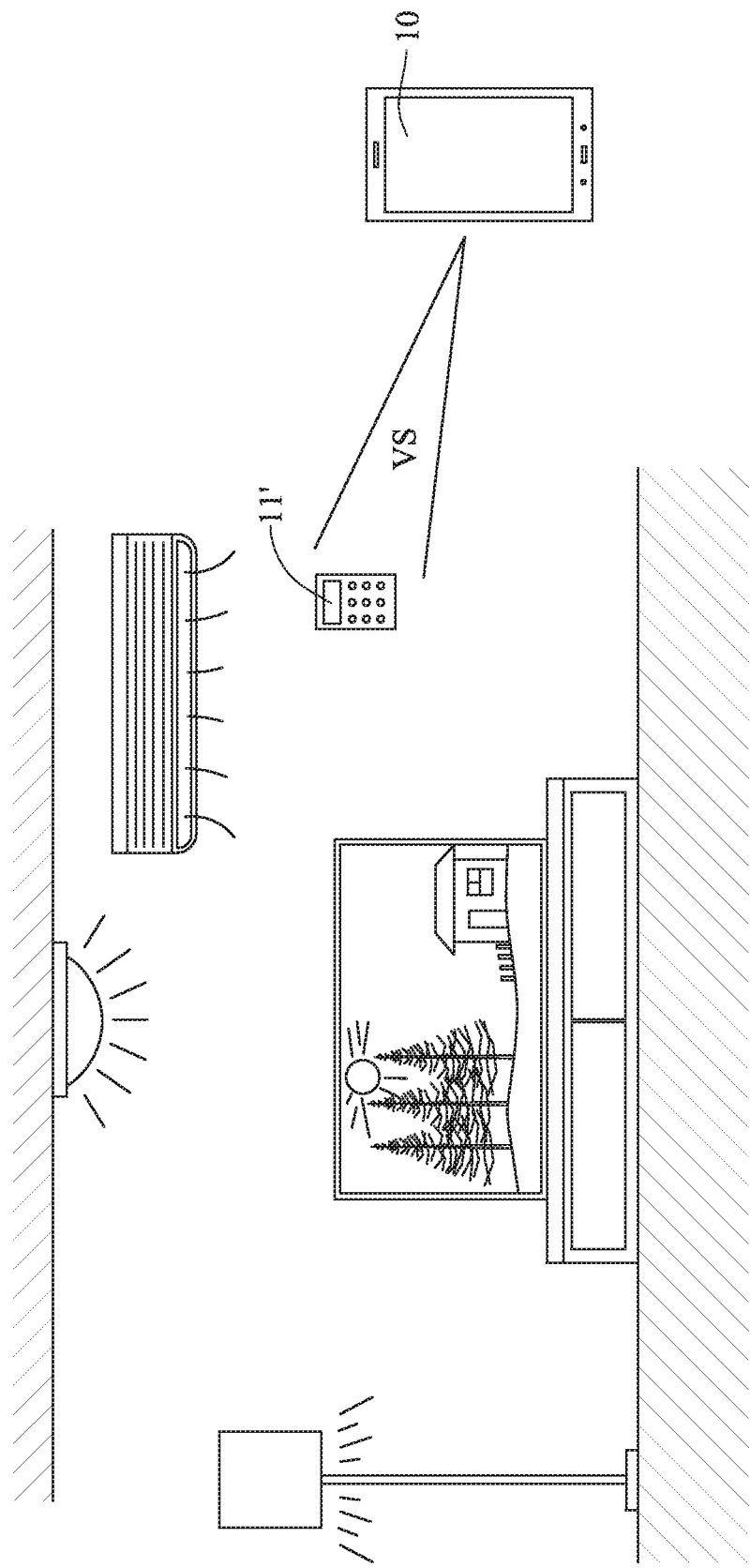

With reference to FIG. 5 and FIG. 6 for a first schematic view and a second schematic view of a visible light identity authorization system of a second embodiment in accordance with the present invention, the embodiment illustrates a usage situation of the visible light identity authorization system.

As shown in FIG. 5, a user uses an electronic device 10 to recognize his fingerprint to generate a biological feature signal. Then, the electronic device 10 encrypts the international mobile equipment identity number thereof and the biological feature signal to generate an encrypted signal, and converts the encrypted signal into a visible light signal VS.

As shown in FIG. 6, the user uses the flash lamp of the electronic device 10 to transmit the visible light signal VS to a smart home management device 11'.

The smart home management device 11' converts the visible light signal VS into an encrypted signal, and the decrypts the encrypted signal to generate a decrypted signal so as to perform the identity authorization process. After the identity authorization process succeeds, the smart home management device 11' turns on the air conditioner, the lamps and TV.

To sum up, according to one embodiment of the present invention, the electronic device can encrypt the international mobile equipment identity number of the electronic device and a biological feature signal to generate an encrypted signal, so the encrypted signal can simultaneously have both of the uniqueness of the international mobile equipment identity number and the specialty of the biological feature, which can optimize the information security of the encrypted signal.

Besides, according to one embodiment of the present invention, the electronic device has a special encryption mechanism, which can achieve high information security, so is applicable to entry access control, data management and the like.

Moreover, according to one embodiment of the present invention, the electronic device can integrate the learning vector quantization and the message-digest algorithm; thus, the electronic device can simultaneously better the performance of the biological feature identification and improve the information security of the signal encryption.

Furthermore, according to one embodiment of the present invention, the electronic device can use the learning vector quantization to perform the biological feature identification and use the message-digest algorithm to perform the data encryption; both of the above algorithms can be directly applied to various electronic devices, such as mobile communication device, personal computer, camera or IoT device, etc., which is more flexible in use.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An electronic device, comprising:
a fingerprint recognition device or an iris pattern recognization device, configured to recognize a biological feature, and convert the biological feature into a biological feature signal via a learning vector quantization;
a microcontroller unit, configured to encrypt an international mobile equipment identity number of the electronic device and the biological feature signal, obtained by converting the biological feature via the learning vector quantization, via a message-digest algorithm to generate an encrypted signal, and convert the encrypted signal into a visible light signal, whereby the visible light signal generated by converting the encrypted signal simultaneously has characteristics of both the international mobile equipment identity number and the biological feature, whereby a biological feature identification performance is enhanced and an information security of signal encryption is optimized via a combination of the learning vector quantization and the message-digest algorithm; and
a screen, configured to transmit the visible light signal to a controlled device so as to implement an identity authorization process according to the international mobile equipment identity number and the biological feature, whereby an information security of visible light communication is enhanced.

2. The electronic device of claim 1, wherein the biological feature is a fingerprint or an iris pattern.

3. The electronic device of claim 1, wherein the electronic device is a mobile communication device, a personal computer, a camera device or an IoT device.

4. A visible light identity authorization system, comprising:
an electronic device, configured to recognize a biological feature, convert the biological feature into a biological feature signal via a learning vector quantization, encrypt an international mobile equipment identity number of the electronic device and the biological feature signal, obtained by converting the biological feature via the learning vector quantization, via a message-digest algorithm to generate an encrypted signal, and convert the encrypted signal into a visible light signal, whereby the visible light signal generated by converting the encrypted signal simultaneously has characteristics of both the international mobile equipment identity number and the biological feature, whereby a biological feature identification performance is enhanced and an information security of signal encryption is optimized via a combination of the learning vector quantization and the message-digest algorithm; and
a controlled device, configured to receive the visible light signal, convert the visible light signal into the encrypted signal, and decrypt the encrypted signal to perform an identity authorization process so as to implement an identity authorization process according to the international mobile equipment identity number and the biological feature, whereby an information security of visible light communication is enhanced.

5. The visible light identity authorization system of claim 4, wherein the biological feature is a fingerprint or an iris pattern.

6. The visible light identity authorization system of claim 4, wherein the electronic device outputs the visible light signal via a light transmission module, and the light transmission module is a screen, a light source or a flash lamp.

7. The visible light identity authorization system of claim 4, wherein the controlled device receives the visible light signal via a light receiving module, and the light receiving module is a photo diode or a lens.

8. The visible light identity authorization system of claim 4, wherein the electronic device is a mobile communication device, a personal computer, a camera device or an IoT device.

9. A visible light identity authorization method, comprising the following steps:
recognizing a biological feature via an electronic device;
converting the biological feature into a biological feature signal via a learning vector quantization by the electronic device;
encrypting an international mobile equipment identity number of the electronic device and the biological feature signal, obtained by converting the biological feature via the learning vector quantization, via a message-digest algorithm to generate an encrypted signal, and convert the encrypted signal into a visible light signal by the electronic device, whereby the visible light signal generated by converting the encrypted signal simultaneously has characteristics of both the international mobile equipment identity number and the biological feature, whereby a biological feature identification performance is enhanced and an information security of signal encryption is optimized via a combination of the learning vector quantization and the message-digest algorithm;

receiving the visible light signal and converting the visible light signal into the encrypted signal by the controlled device; and decrypting the encrypted signal by the controlled device to perform an identity authorization process so as to implement an identity authorization process according to the international mobile equipment identity number and the biological feature, whereby an information security of visible light communication is enhanced.

10. The visible light identity authorization method of claim 9, wherein the biological feature is a fingerprint or an iris pattern.

11. The visible light identity authorization method of claim 9, wherein the electronic device outputs the visible light signal via a light transmission module, and the light transmission module is a screen, a light source or a flash lamp.

12. The visible light identity authorization method of claim 9, wherein the controlled device receives the visible light signal via a light receiving module, and the light receiving module is a photo diode or a lens.

13. The visible light identity authorization method of claim 9, wherein the electronic device is a mobile communication device, a personal computer, a camera device or an IoT device.

* * * * *